United States Patent [19]

Swanson

[11] Patent Number: 5,301,765
[45] Date of Patent: Apr. 12, 1994

[54] BATTERY PACK INSTALLATION AND STORAGE SYSTEM FOR ELECTRIC VEHICLES

[76] Inventor: Lennart H. Swanson, 284 Aria Dr., Pacheco, Calif. 94553

[21] Appl. No.: 61,012

[22] Filed: May 14, 1993

[51] Int. Cl.$^5$ ................... B60K 1/04; B60L 11/18
[52] U.S. Cl. ................... 180/68.5; 180/65.1; 414/462; 414/522; 296/26; 224/42.44; 104/34
[58] Field of Search .............. 180/68.5, 298, 65.1; 296/26; 224/281, 42.43, 42.44; 414/462, 522; 108/143; 105/50, 51; 104/34

[56] References Cited

U.S. PATENT DOCUMENTS

| | | | |
|---|---|---|---|
| 1,730,875 | 10/1929 | Brown | 104/34 |
| 2,547,083 | 4/1951 | Lundgren | 224/42.44 X |
| 3,708,028 | 1/1973 | Hafer | 104/34 |
| 3,838,745 | 10/1974 | Kappei | 180/68.5 |
| 3,847,242 | 11/1974 | Kappei | 180/68.5 |
| 3,876,086 | 4/1975 | Kappei | 104/34 |
| 4,102,273 | 7/1978 | Merkle et al. | 104/34 |
| 4,109,064 | 8/1978 | Warner et al. | 429/99 |
| 4,258,816 | 3/1981 | Klink | 414/462 X |
| 4,267,895 | 5/1981 | Eggert, Jr. | 180/68.5 X |
| 4,278,387 | 7/1981 | Seguela et al. | 414/462 |
| 4,362,220 | 12/1982 | Baston | 180/68.5 |
| 4,993,088 | 2/1991 | Chudik | 296/26 X |
| 5,052,878 | 10/1991 | Brockhaus | 224/42.44 X |

FOREIGN PATENT DOCUMENTS

| | | | |
|---|---|---|---|
| 3150652 | 6/1983 | Fed. Rep. of Germany | 180/68.5 |
| 0470463 | 8/1937 | United Kingdom | 180/68.5 |

*Primary Examiner*—Margaret A. Focarino
*Assistant Examiner*—Peter English
*Attorney, Agent, or Firm*—Thomas R. Lampe

[57] ABSTRACT

Apparatus for use in association with an electric vehicle including an electric motor and a vehicle body having a storage compartment to facilitate interchange of battery packs in the storage compartment. The apparatus includes a movable frame for receiving a battery pack having electrical fittings. The frame is movable to a position where the electrical fittings of the battery pack engage electrical fittings leading to the electric motor.

3 Claims, 3 Drawing Sheets

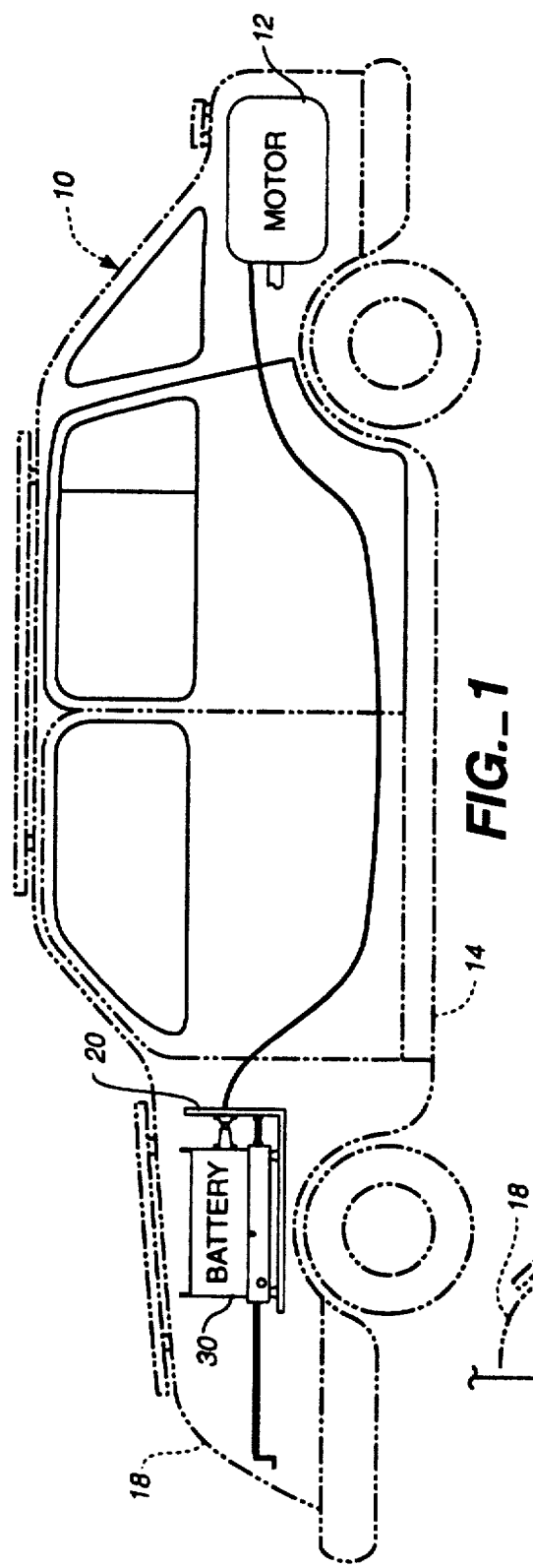
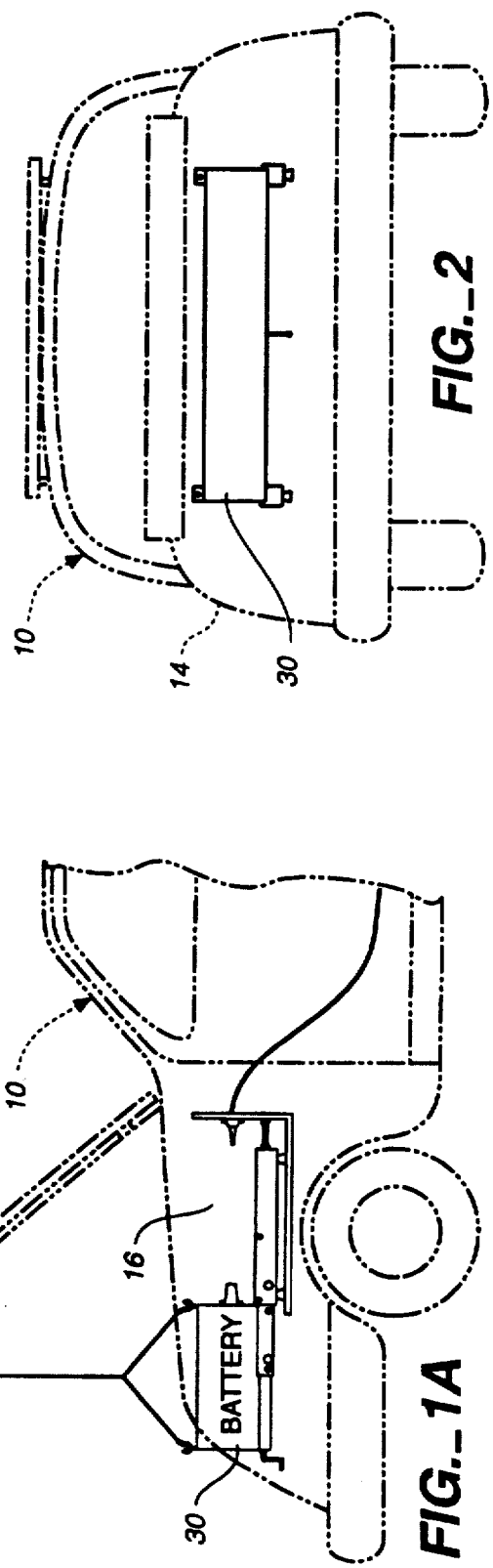
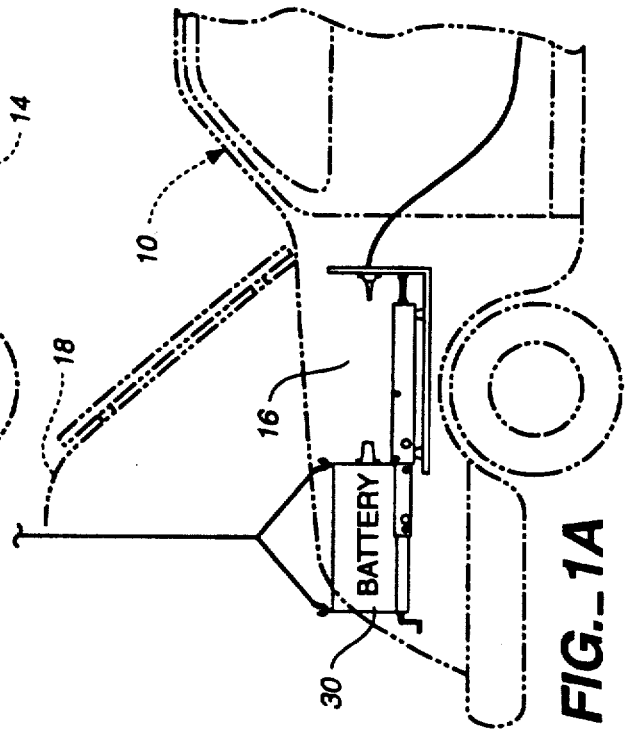

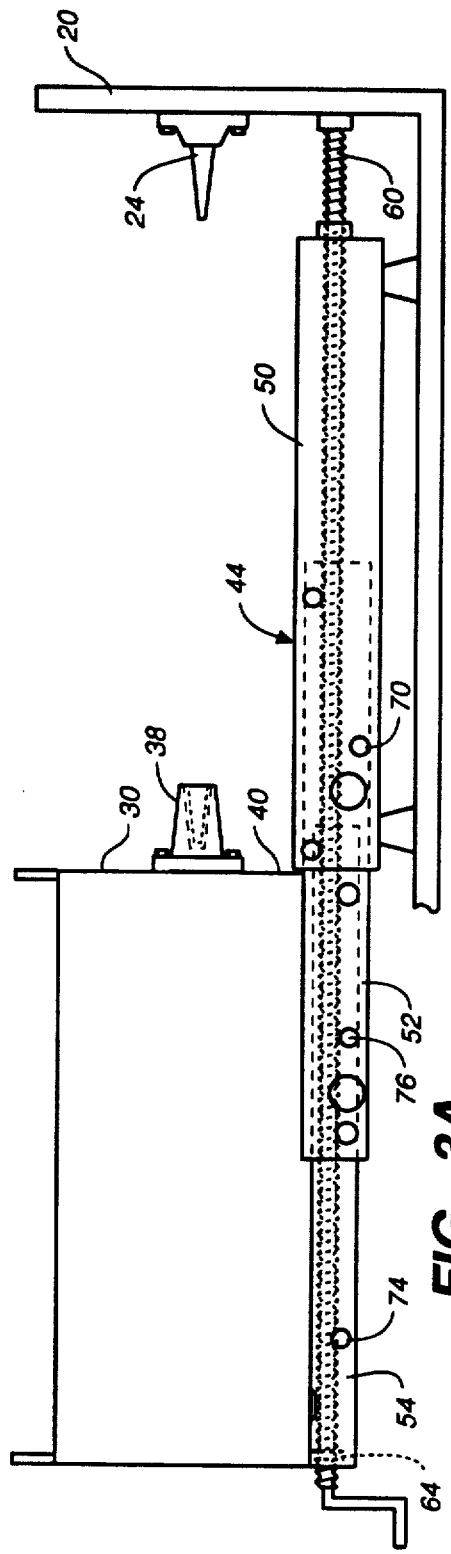
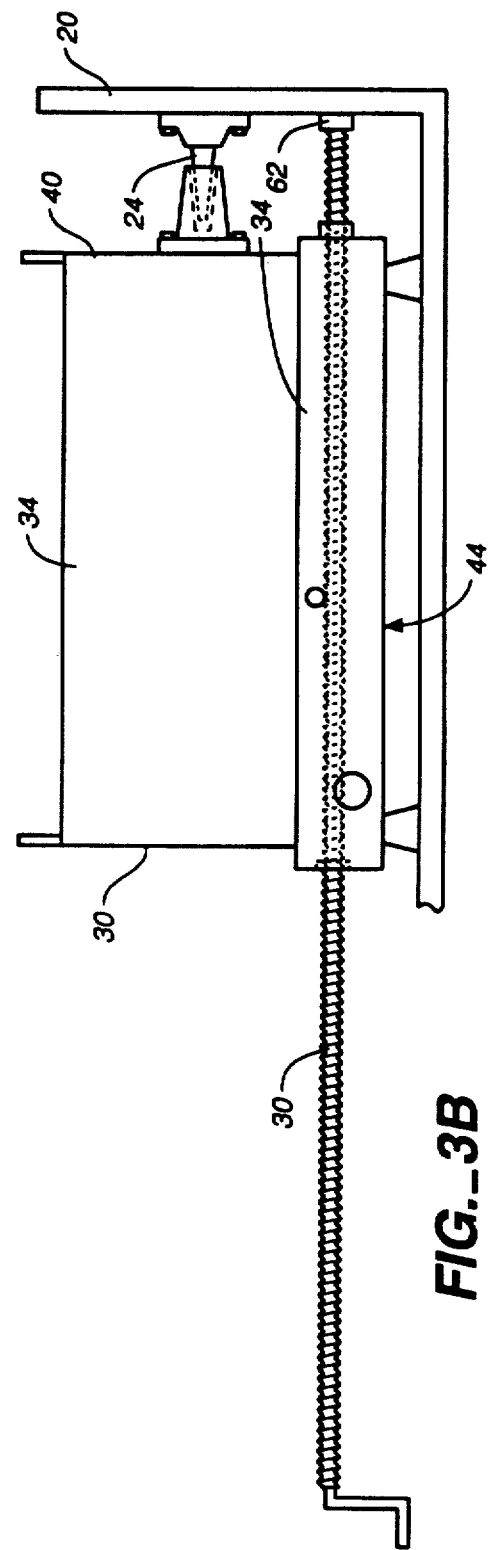
FIG._3A
FIG._3B

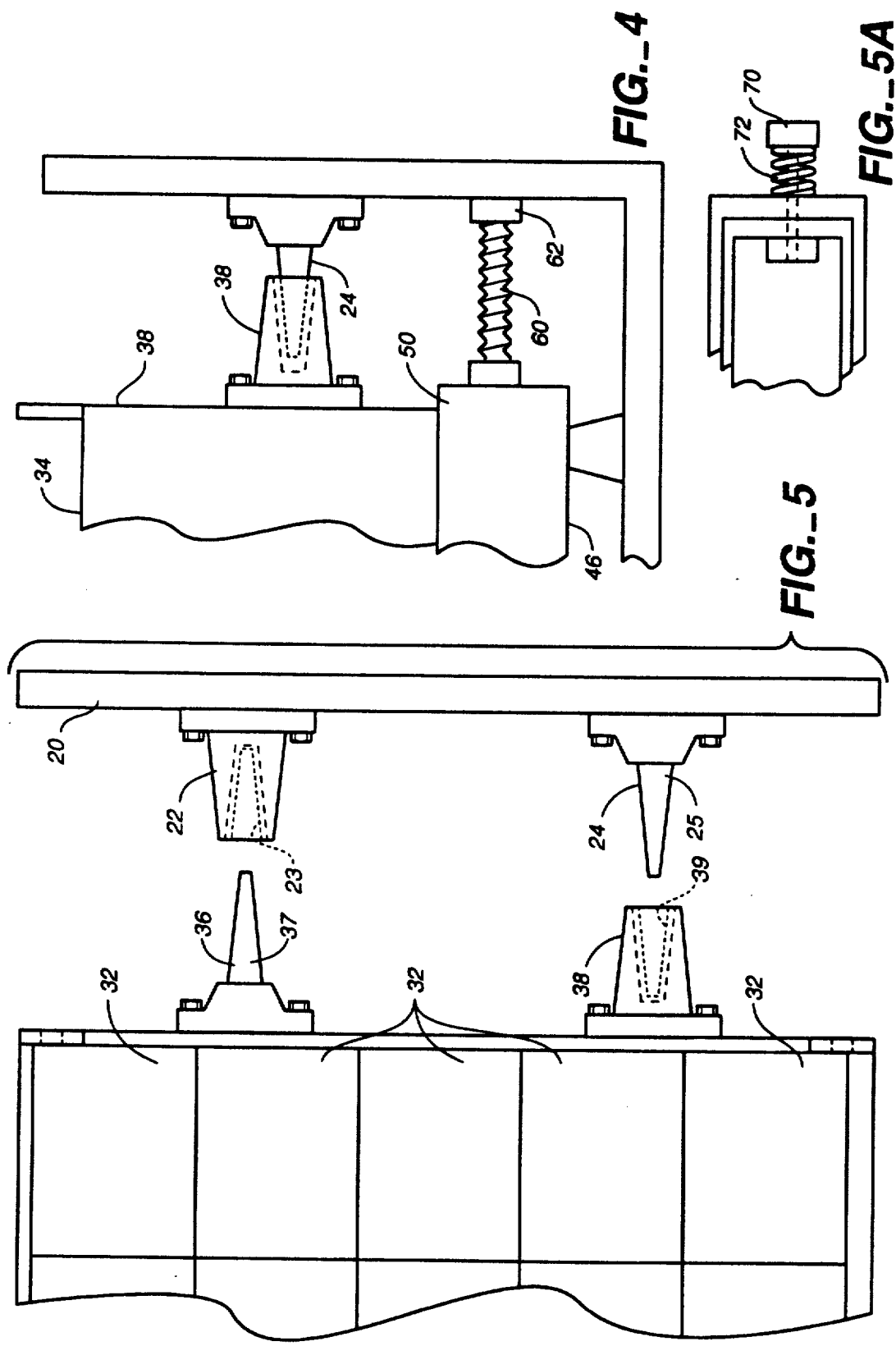

BATTERY PACK INSTALLATION AND STORAGE SYSTEM FOR ELECTRIC VEHICLES

TECHNICAL FIELD

This invention relates to apparatus allowing for the ready installation of a battery pack in a storage compartment of an electric vehicle and exchange of battery packs.

BACKGROUND ART

Electric vehicles are well known in the transportation art. Popularity of such vehicles is again on the increase for a number of reasons, including the non-polluting characteristics of such vehicles.

Vehicles powered by electricity, however, do have drawbacks. For example, the current state of technology limits the range of such vehicles. The batteries of a conventional electrically powered passenger car or other road vehicle often have to be recharged after about 125 miles or even considerably less. Most electric automobiles incorporate battery packs which are permanently or semi-permanently installed; that is, the same batteries remain in the car and are recharged over and over again. This results in considerable accumulated downtime for the vehicle due to the fact that the recharging procedure is relatively slow. Only after the performance of the batteries has deteriorated significantly are they removed from the vehicle and replaced.

It is known to insert and remove batteries relative to passenger cars and other vehicles as modular packs wherein a plurality of batteries are in each modular pack. For example, the following patents illustrate such arrangements: U.S. Pat. No. 3,838,745, issued Oct. 1, 1974, U.S. Pat. No. 3,847,242, issued Nov. 12, 1974, and U.S. Pat. No. 4,109,064, issued Aug. 22, 1978. Other representative arrangements are disclosed in the following U.S. Pat. Nos.: 3,876,086, issued Apr. 8, 1975, 4,102,273, issued Jul. 25, 1978, and 3,708,028, issued Jan. 2, 1973.

Prior art arrangements are generally characterized by their relative complexity and high expense. Furthermore, removal and insertion of prior art batteries and battery packs in electric powered vehicles is often a time consuming matter, not only because of the relative complexity of such arrangements, but also due to the fact that electrical interconnect between the batteries and battery packs and the electric system of the vehicle is itself time consuming, often requiring considerable work by the installer.

DISCLOSURE OF INVENTION

The present invention relates to apparatus for use in association with an electric vehicle having an electric motor in a vehicle body having a storage compartment. The apparatus is of relatively simple, inexpensive construction and provides for the ready installation of a battery pack in the vehicle as well as for the ready removal of the battery pack therefrom. Electrical interconnect with the vehicle's electric drive is accomplished virtually automatically upon installation, thus avoiding work on the part of the installer in this regard. Removal of the battery pack from the vehicle is accomplished just as efficiently and with a minimum of time and effort.

This makes the apparatus of the present invention particularly suitable for use in connection with a vehicle used for long range trips, the operator having the ability to promptly obtain a battery pack exchange at one or more locations along the way. For example, a network of battery pack exchange stations can be established in order to provide virtually unlimited vehicle range, the driver simply stopping at one or more stations in the network for a quick battery pack exchange when desired.

The apparatus includes mounting means positioned within the storage compartment of the vehicle and movable relative to the vehicle between a first position and a second position. The mounting means is for receiving and supporting a selectively removable battery pack having electrical connectors.

Electrical contact means is connected to the vehicle body and operatively associated with the electric motor thereof.

Transport means is provided for selectively transporting the mounting means between the first position and the second position relative to the vehicle, the electrical contact means being so located relative to the mounting means as to engage with the electrical connectors of a battery pack supported by the mounting means when the mounting means is in the first position. Disengagement to allow removal of the battery pack from the mounting means is accomplished when the mounting means has been moved to the second position by the transport means.

The mounting means at least partially comprises a frame having a bottom support, the battery pack being selectively insertable in the frame and on the bottom support and removable from the frame bottom support.

The electrical contact means and the battery pack electrical connectors comprise a plurality of matingly engageable male and female electrical fittings.

The frame is at least partially comprised of a plurality of relatively movable, telescoping frame elements. The transport means includes actuator means operatively associated with the frame elements to selectively extend and retract the frame and move the frame between the first and second positions.

Other features, advantages, and objects of the present invention will become apparent with reference to the following description and accompanying drawings.

BRIEF DESCRIPTION OF DRAWINGS

FIG. 1 is a somewhat schematic presentation of an electrically powered automobile depicted in phantom illustrating apparatus constructed in accordance with the teachings of the present invention installed therein;

FIG. 1A is a partial side view illustrating a battery pack being removed from the automobile;

FIG. 2 is a frontal view of the apparatus in the automobile;

FIG. 3A and 3B ar side views of the apparatus with the structural components thereof in different relative positions;

FIG. 4 is an enlarged, detail, side view of a portion of the apparatus;

FIG. 5 is a partial, top view of the apparatus; and

FIG. 5A is a partial, sectional view illustrating a lock arrangement employed in the apparatus.

BEST MODE FOR CARRYING OUT THE INVENTION

Referring now to the drawings, an electric vehicle 10 is illustrated in phantom, the vehicle having an electric motor 12 and a vehicle body 14 having a storage compartment 16. The storage compartment 16, in the arrangement illustrated, is disposed at the front of the automobile 10; however, the principles of the present invention are applicable to vehicles having storage compartments elsewhere, such as in the rear of the car. Although the electric motor 12 is illustrated as being located at the back of the car, location thereof is optional and the motor may, for example, be located at the front of the vehicle. If desired, the vehicle may, as shown, have solar panels mounted thereon.

A compartment cover in the form of a hood 18 normally covers the interior of the storage compartment but can be opened in a conventional manner to expose the interior of the storage compartment. FIG. 1 shows the hood closed and FIG. 1A shows the hood open. A wall 20 defines the inner limits of the storage compartment.

A pair of electrical fittings are connected to the wall 20. The electrical fittings comprise a female electrical fitting 22 having an inner tapered wall 23 and a male electrical fitting 24 having a generally corresponding sized outer tapered wall 25. These electrical contacts or fittings are inputs to and comprise a portion of the vehicle's electric drive system. Electrical fittings 22, 24 are formed of copper or other highly conductive material and are insulated from the wall 20. A suitable hardwired circuit interconnects the fittings 22, 24 to the motor 12.

Positioned within storage compartment 16 is means for mounting a battery pack 30 which is of unitary, modular construction. More particularly, the illustrated battery pack 30 includes a plurality of electrically interconnected batteries 32 disposed in a case 34.

Electrical connectors 36, 38 are affixed to the case 34 at the inner end 40 thereof. Electrical connector 36 is a male electrical fitting having an outer tapered wall 37 and the electrical connector 38 is a female electrical fitting having an inner wall 39. Connectors or fittings 36, 38 are insulated from both each other and from the case 34, it being understood that the connectors or fittings 36, 38 are electrically connected through suitable conventional means (not shown) to the batteries of battery pack 30.

The mounting means for receiving and supporting battery pack 30 is in the form of a frame 44 having a bottom support 46 upon which the battery pack is positioned. The frame is a telescoping frame including telescoping frame segments 50, 52 and 54. Frame segment 50 is affixed to the vehicle body and frame segments 52, 54 are movable relative to frame segment 50 and also relative to each other. Suitable roller bearings are preferably employed to facilitate relative movement between the frame segments.

The frame is movable between a first or retracted position shown in FIG. 3B and a second, extended position shown in FIG. 3A. The frame positions the battery pack 30 so that the electrical connectors or fittings 36, 38 operatively associated therewith connect to or engage the electrical fittings 22, 24 on wall 20 when the frame is in its first or retracted condition or position. When the frame is in its extended or second position the battery pack and electrical fittings 36, 38 move away from the wall 20 and away from electrical fittings 22, 24. The tapered inner and outer walls of the electrical fittings ensure proper alignment and engagement by the electrical fittings.

Means is provided for transporting the frame between the first and second positions. More particularly, an elongated shaft 60 is rotatably mounted in a fixed bushing 62 on wall 20. The elongated shaft 60 extends along the length of frame 44 and threadedly engages the threads of a nut 64 affixed to the outermost frame segment, i.e. frame segment 54. Rotation of the shaft 60 will thus cause retraction or extension of the frame and movement of the battery pack within the storage compartment.

Lock means is employed to lock the frame in retracted position. In the arrangement illustrated, a shaft or bolt 70 is mounted on frame segment 50 and slidable in an aperture in frame segment 50. A spring 72 biases the lock bolt toward frame segments 52 and 54 and through apertures 76, 74 formed respectively therein. When the lock bolt is in the apertures of all three frame segments, the segments cannot move relative to each other. When, however, the lock bolt is manually retrieved from the apertures against the bias exerted by spring 72, relative movement between the frame segments is possible.

The arrangement just described ensures that the battery pack will traverse the same precise path during retraction or extension. In the extended position the frame presents the battery pack at a location out of registry with the open hood so that the battery pack may be hoisted or lowered in unobstructed fashion by conventional hoist equipment, for example, a fork lift or hydraulic hoist. The frame and tapered electrical fittings ensure that proper alignment is had at all times when the battery pack is moved to the retracted position.

We claim:

1. Apparatus in combination with an electric vehicle having an electric motor, a vehicle body having a storage compartment and a storage compartment cover movable between an open position and a closed position, said apparatus comprising, in combination:

mounting means positioned within said storage compartment and including a telescoping frame having a plurality of relatively movable frame elements, one of said frame elements having a bottom support movable relative to said vehicle between a first position and a second position, said mounting means for receiving and supporting a selectively removable battery pack having electrical connectors at an end of said battery pack;

electrical contact means connected to said vehicle body at a predetermined location on said vehicle body in substantial alignment with said electrical connectors when the frame element bottom support is in either said first position or said second position and operatively associated with said electric motor, said electrical contact means and said electrical connectors comprising a plurality of tapered, matingly engageable male and female electrical fittings, and said predetermined location being on a generally vertical wall partially defining said storage compartment;

transport means for selectively transporting said frame element bottom support between said first position and said second position relative to said vehicle with said frame element bottom support moving along a predetermined substantially horizontal path of movement, said electrical contact means being so located relative to said mounting means as to engage with the electrical connectors of said battery pack supported by said frame element bottom support when said frame element bottom support is in said first position and said frame element bottom support is closely adjacent to said generally vertical wall and disengaged therefrom to allow removal of the battery pack from said mounting means when said mounting means has been moved to said second position by said transport means, said transport means including actuator means operatively associated with said frame elements to selectively extend and telescope said frame elements and move said frame element bottom support between said first and second positions, said frame element bottom support when in said second position being uncovered by said storage compartment cover when said storage compartment cover is in open position to permit ready overhead access to said battery pack supported by said frame element bottom support and lifting of said battery pack therefrom; and lock means cooperable with said mounting means for selectively locking said frame against movement relative to said vehicle when said frame element bottom support is in said first position to maintain engagement between the electrical connectors and electrical contact means.

2. The apparatus according to claim 1 wherein said electrical contact means includes a male electrical fitting and a female electrical fitting and wherein said battery pack electrical connectors comprise a female electrical fitting and a male electrical fitting.

3. The apparatus according to claim 1 wherein said actuator means includes a rotatable screw element threadedly connected to at least one of said frame elements.

* * * * *